(12) United States Patent
Gholamipour et al.

(10) Patent No.: US 10,628,300 B2
(45) Date of Patent: Apr. 21, 2020

(54) RAID STRIPE PHYSICAL PLACEMENT

(71) Applicant: Western Digital Technologies, Inc., San Jose, CA (US)

(72) Inventors: Amir Hossein Gholamipour, Irvine, CA (US); Chandan Mishra, Irvine, CA (US); Mai Ghaly, Bloomington, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 226 days.

(21) Appl. No.: 15/811,658

(22) Filed: Nov. 13, 2017

(65) Prior Publication Data

US 2019/0146906 A1 May 16, 2019

(51) Int. Cl.
*G06F 3/06* (2006.01)
*G06F 12/06* (2006.01)
*G06F 12/02* (2006.01)

(52) U.S. Cl.
CPC ........ *G06F 12/0246* (2013.01); *G06F 3/0688* (2013.01); *G06F 3/0689* (2013.01); *G06F 12/0653* (2013.01); *G06F 3/064* (2013.01)

(58) Field of Classification Search
CPC ............... G06F 3/00; G06F 3/06–0689; G06F 5/00–16; G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004;
(Continued)

(56) References Cited

U.S. PATENT DOCUMENTS 5,860,091 A * 1/1999 DeKoning ............ G06F 3/0626
711/114
6,839,827 B1 * 1/2005 Beardsley ............ G06F 3/0605
711/114
(Continued)

OTHER PUBLICATIONS

RAID Parity Calculation using XOR Operation; dataclinic; Apr. 4, 2013; retrieved from https://www.dataclinic.co.uk/raid-parity-xor/ on Aug. 21, 2019 (Year: 2013).*
(Continued)

*Primary Examiner* — Daniel C. Chappell
(74) *Attorney, Agent, or Firm* — Kunzler Bean & Adamson, PC

(57) ABSTRACT

Apparatuses, systems, methods, and computer program products are disclosed for redundant array of independent disks (RAID) stripe physical placement. An apparatus includes a plurality of memory die comprising physical pages for storing data. An apparatus includes a control circuit that assigns addresses to a plurality of data stripes, wherein the control circuit assigns the addresses to the plurality of data stripes by: assigning stripe pages of a data stripe of the plurality of data stripes to different memory die of a plurality of memory die; and assigning adjacent stripe pages of the data stripe to different page numbers.

19 Claims, 8 Drawing Sheets

(58) Field of Classification Search
CPC ........ G06F 2216/00–17; G06F 2221/00–2153; G11C 11/00–5692; G11C 13/00–06; G11C 15/00–06; G11C 16/00–3495; G11C 17/00–18; G11C 2216/00–30
See application file for complete search history.

(56) References Cited

U.S. PATENT DOCUMENTS

| | | | | |
|---|---|---|---|---|
| 8,464,095 | B1* | 6/2013 | Bonwick | G06F 11/1088 714/6.2 |
| 9,081,508 | B2* | 7/2015 | Kong | G06F 11/1076 |
| 9,235,471 | B2* | 1/2016 | Sun | G06F 3/0689 |
| 9,286,198 | B2* | 3/2016 | Bennett | G06F 12/00 |
| 9,965,201 | B1* | 5/2018 | Bono | G06F 3/0689 |
| 2005/0120170 | A1* | 6/2005 | Zhu | G06F 3/0607 711/114 |
| 2015/0067245 | A1* | 3/2015 | Kruger | G06F 3/0634 711/103 |
| 2015/0279470 | A1* | 10/2015 | Cerrelli | G11C 16/107 711/103 |
| 2016/0062696 | A1* | 3/2016 | Cerrelli | G06F 3/0638 711/202 |

OTHER PUBLICATIONS

RAID 5 (redundant array of independent disks); Rouse, Margaret; Jul. 2014; retrieved from https://web.archive.org/web/20140730232102/ https://searchstorage.techtarget.com/definition/RAID-5-redundant-array-of-independent-disks on Aug. 21, 2019 (Year: 2014).*

Impact of stripe unit size on performance and endurance of SSD-based RAID arrays; Salmasi et al.; Scientia Iranica, vol. 20, iss. 6, Dec. 2013; retrieved from https://www.researchgate.net/publication/287478403_Impact_of_stripe_unit_size_on_performance_and_endurance_of_SSD-based_RAID_arrays on Dec. 4, 2019 (Year: 2013).*

CD-RAIS: Constrained dynamic striping in redundant array of independent SSDs; Du et al.; 2014 IEEE International Conference on Cluster Computing; Sep. 22-26, 2014 (Year: 2014).*

* cited by examiner

600 ⬈

| First Memory Die 602 | Second Memory Die 604 | Third Memory Die 606 | Fourth Memory Die 608 | Fifth Memory Die 610 | Sixth Memory Die 612 |
|---|---|---|---|---|---|
| 614 | 614 | 614 | 614 | 614 | 614 |
| 616 | 616 | 616 | 616 | 616 | 616 |
| 618 | 618 | 618 | 618 | 618 | 618 |

| First Memory Die 702 | Second Memory Die 704 | Third Memory Die 706 | Fourth Memory Die 708 | Fifth Memory Die 710 |
|---|---|---|---|---|
| 712 | 712 | 712 | 712 | 712 |
| 714 | 714 | 714 | 714 | 714 |
| 716 | 716 | 716 | 716 | 716 |

RAID STRIPE PHYSICAL PLACEMENT

TECHNICAL FIELD

The present disclosure, in various embodiments, relates to memory die and more particularly relates to redundant array of independent disks (RAID) stripe physical placement on memory die.

BACKGROUND

Many electrical circuits and devices, such as data storage devices or the like, include memory die. Memory die may be used to store redundant data by storing RAID stripes. RAID stripes may be distributed across multiple memory die.

SUMMARY

Apparatuses are presented for redundant array of independent disks (RAID) stripe physical placement. In one embodiment, an apparatus includes a plurality of memory die comprising physical pages for storing data. An apparatus, in certain embodiments, includes a control circuit that assigns addresses to a plurality of data stripes, wherein the control circuit assigns the addresses to the plurality of data stripes by: assigning stripe pages of a data stripe of the plurality of data stripes to different memory die of a plurality of memory die; and assigning adjacent stripe pages of the data stripe to different page numbers.

Systems are presented for RAID stripe physical placement. A system, in one embodiment, includes a controller. In various embodiments, a system includes a plurality of storage devices (e.g., persistent memory, storage class memory, or the like) comprising physical pages (e.g., write-in-place physical pages) for storing data. In a further embodiment, the controller is configured to distribute a plurality of array stripes having a number of pages per array stripe across a plurality of storage devices by: placing stripe pages of an array stripe of the plurality of array stripes in different storage devices of the plurality of storage devices; and assigning exclusive or (XOR) pages corresponding to the plurality of array stripes such that the XOR pages are distributed across the plurality of storage devices.

An apparatus for RAID stripe physical placement, in one embodiment, includes means for storing a plurality of data stripes in a plurality of memory devices, wherein a number of memory devices of the plurality of memory devices is not a multiple of a number of pages per data stripe of the plurality of data stripes. In some embodiments, an apparatus includes means for determining locations to store a plurality of data stripes.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which:

FIG. 3 is a schematic block diagram illustrating one embodiment of RAID stripe physical placement;

FIG. 4 is a schematic block diagram illustrating another embodiment of RAID stripe physical placement;

FIG. 8 is a schematic block diagram illustrating a further embodiment of RAID stripe physical placement.

DETAILED DESCRIPTION

Figure 1A:
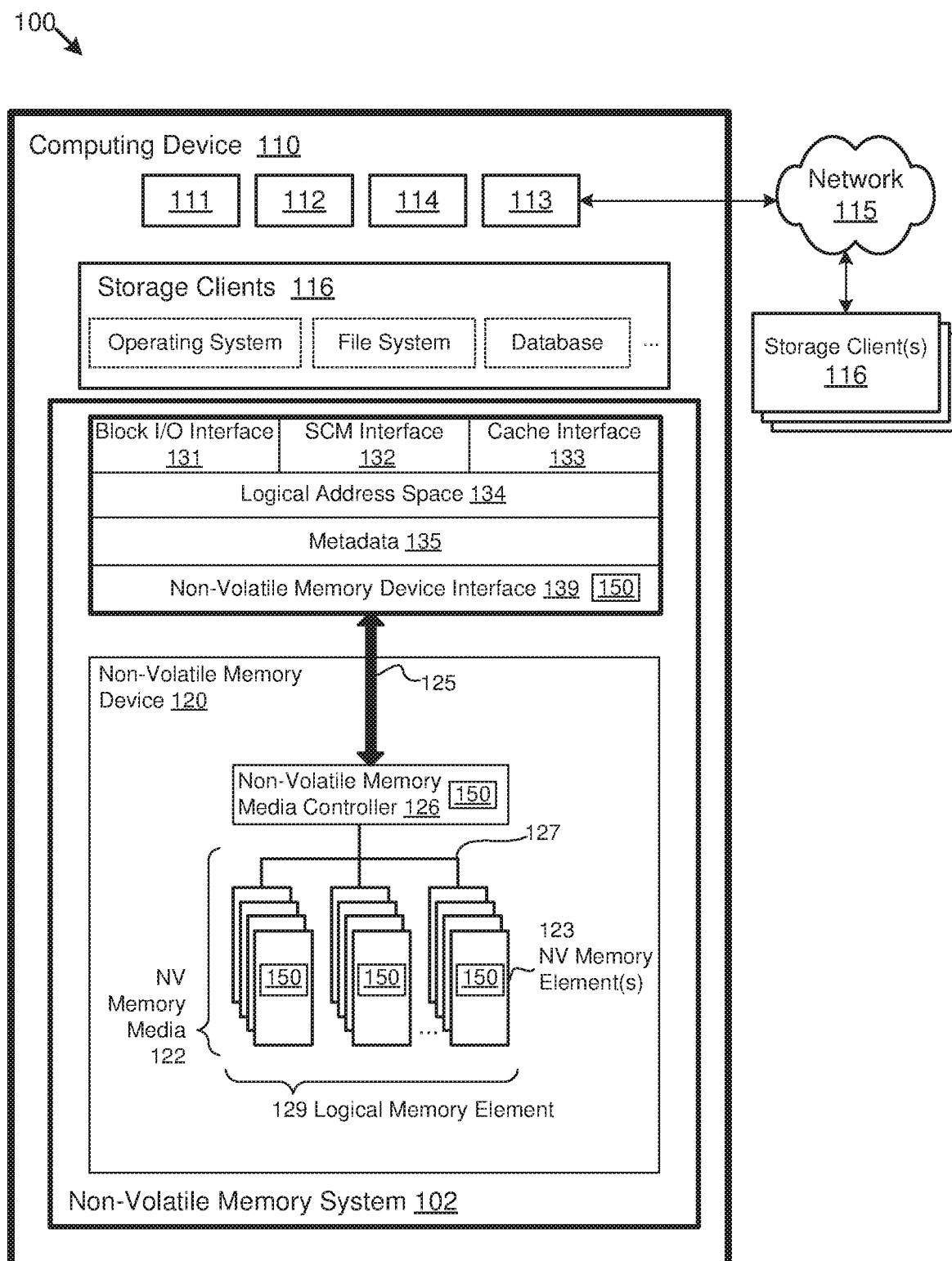
FIG. 1A is a schematic block diagram illustrating one embodiment of a system for redundant array of independent disks (RAID) stripe physical placement.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1A is a block diagram of one embodiment of a system 100 comprising a stripe placement component 150 for a non-volatile memory device 120. The stripe placement component 150 may be part of and/or in communication with a non-volatile memory media controller 126, a non-volatile memory element 123, a device driver, or the like. The stripe placement component 150 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or non-volatile memory controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more non-volatile DIMM (NVDIMM) cards, one or more persistent NVDIMM (NVDIMM-P) cards, one or more cache coherent interconnect for accelerators (CCIX) cards, one or more Gen-Z cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein. Alternatively, or in addition, the stripe placement component 150 may be embodied as one or more computer readable instructions stored on the non-transitory storage medium 114.

The non-volatile memory system 102, in the depicted embodiment, includes a stripe placement component 150. The stripe placement component 150, in one embodiment, is configured to determine placement of RAID stripes on the non-volatile memory device 120 (e.g., a plurality of memory die 123) described below. The stripe placement component 150, in certain embodiments, may assign stripe pages of RAID stripes to different memory die of a plurality of memory die. The stripe placement component 150 may also assign adjacent stripe pages of RAID stripes to different page numbers. Thus, stripe pages of RAID stripes may be distributed among a plurality of memory die.

In one embodiment, the stripe placement component 150 may comprise logic hardware of one or more non-volatile memory devices 120, such as a non-volatile memory media controller 126, a non-volatile memory element 123, a device controller, a field-programmable gate array (FPGA) or other programmable logic, firmware for an FPGA or other programmable logic, microcode for execution on a microcontroller, an application-specific integrated circuit (ASIC), or the like. In another embodiment, the stripe placement component 150 may comprise executable software code, such as a device driver or the like, stored on the computer readable storage medium 114 for execution on the processor 111. In a further embodiment, the stripe placement component 150 may include a combination of both executable software code and logic hardware.

In one embodiment, the stripe placement component 150 is configured to receive storage requests from a device driver or other executable application via a bus 125 or the like. The stripe placement component 150 may be further configured to transfer data to/from a device driver and/or storage clients 116 via the bus 125. Accordingly, the stripe placement component 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the stripe placement component 150 may receive storage requests as an API call from a storage client 116, as an IO-CTL command, or the like.

According to various embodiments, a non-volatile memory controller 126 in communication with one or more stripe placement components 150 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the non-volatile memory media controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective non-volatile memory media controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more non-volatile memory media controllers 126.

A device driver may present a logical address space 134 to the storage clients 116 through one or more interfaces. As discussed above, the logical address space 134 may comprise a plurality of logical addresses, each corresponding to respective media locations of the one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the non-volatile memory controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The non-volatile memory controller 126 is part of and/or in communication with one or more non-volatile memory devices 120. Although FIG. 1A depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM) and/or persistent memory.

While legacy technologies such as NAND flash may be block and/or page addressable, storage class memory, in one embodiment, is byte addressable. In further embodiments, storage class memory may be faster and/or have a longer life (e.g., endurance) than NAND flash; may have random write access instead of or in addition to the sequential programming of NAND flash (e.g., allowing write-in-place programming of data); may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof. In certain embodiments, because the non-volatile memory media 122 may comprise storage class memory, the stripe placement component 150 may read data (e.g., a RAID stripe) from a location on a memory die 123, update the data, and write it back to the same location on the memory die 123 (e.g., overwriting the previous version of the data).

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, or the like. A non-volatile memory media controller 126 may be configured to manage data operations on the non-volatile memory media 122, and may comprise one or more processors, programmable processors (e.g., FPGAs), ASICs, micro-controllers, or the like. In some embodiments, the non-volatile memory media controller 126 is configured to store data on and/or read data from the non-volatile memory media 122, to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The non-volatile memory controller 126 may organize a block of word lines within a non-volatile memory element 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory element 123 may be physically arranged in a monotonically increasing sequence of word line addresses, with consecutively addressed word lines also being physically adjacent (e.g., WL0, WL1, WL2, . . . WLN).

The non-volatile memory controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102.

A device driver may further comprise a non-volatile memory device interface 139 that is configured to transfer data, commands, and/or queries to the non-volatile memory media controller 126 over a bus 125, as described above.

Figure 1B:
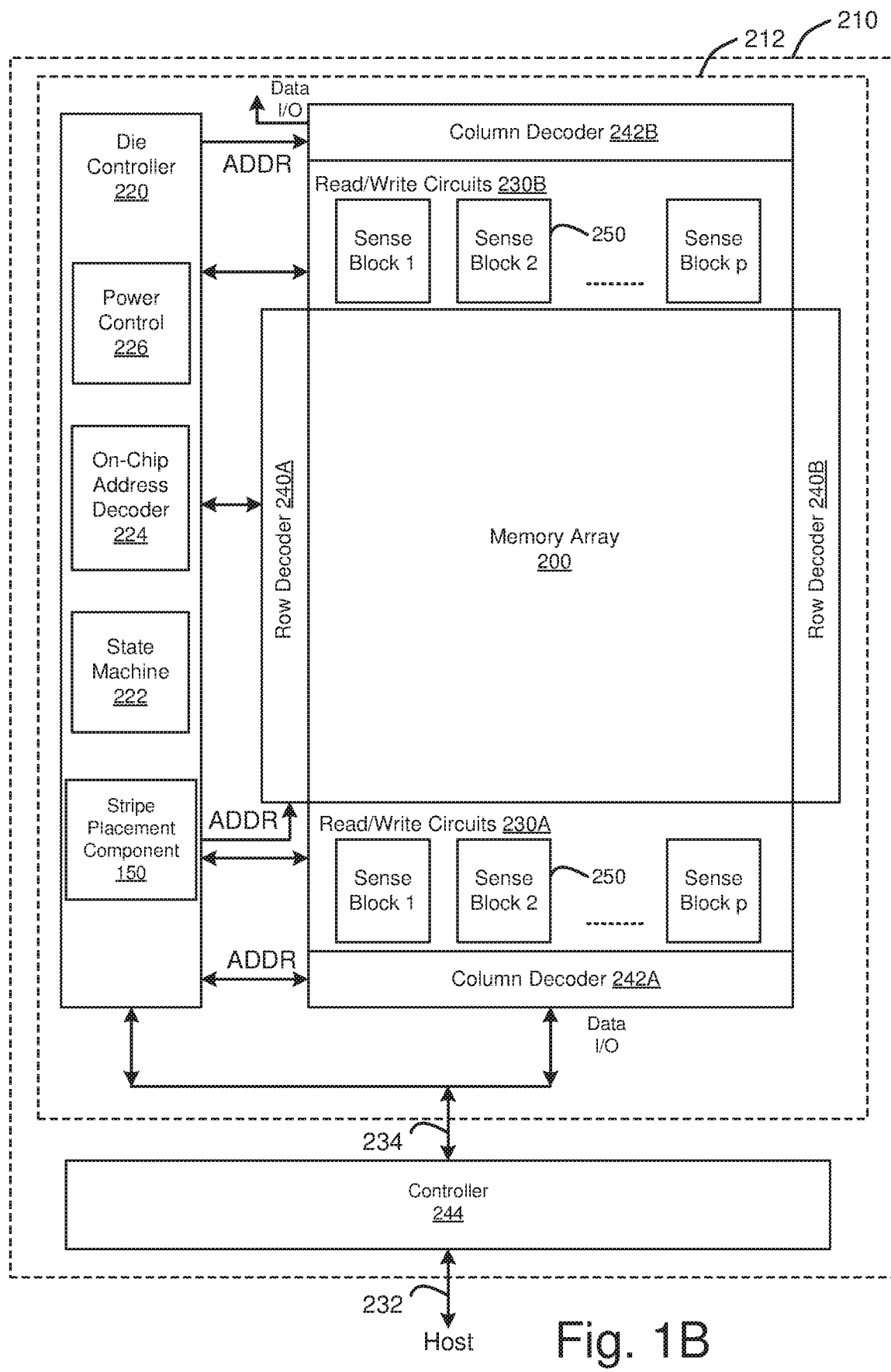
FIG. 1B is a schematic block diagram illustrating another embodiment of a system for RAID stripe physical placement.

FIG. 1B illustrates an embodiment of a non-volatile storage device 210 that may include one or more memory die or chips 212. Memory die 212, in some embodiments, includes an array (two-dimensional or three dimensional) of memory cells 200, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, is addressable by word lines via row decoders 240A/240B and by bit lines via column decoders 242A/242B. In some embodiments, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation can include multiple chips 212.

Die controller 220, in one embodiment, cooperates with the read/write circuits 230A/230B to perform memory operations on the memory array 200. The die controller 220, in certain embodiments, includes a stripe placement component 150, a state machine 222, and an on-chip address decoder 224. In one embodiment, the state machine 222 comprises at least a portion of the stripe placement component 150. In a further embodiment, the controller 244 comprises at least a portion of the stripe placement component 150. In various embodiments, one or more of the sense blocks 250 comprises at least a portion of the stripe placement component 150.

The stripe placement component 150, in one embodiment, is configured to place stripe pages of an array stripe in different storage devices of a plurality of storage devices (e.g., memory die), and assign exclusive or (XOR) pages corresponding to a plurality of array stripes such that the XOR pages are distributed across the plurality of storage devices.

The state machine 222, in one embodiment, provides chip-level control of memory operations. The on-chip address decoder 224 provides an address interface to convert between the address that is used by the host or a memory controller to the hardware address used by the decoders 240A, 240B, 242A, 242B. In certain embodiments, the state machine 222 includes an embodiment of the stripe placement component 150. The stripe placement component 150, in certain embodiments, is embodied as software in a device driver, hardware in a device controller 244, and/or hardware in a die controller 220 and/or state machine 222.

In one embodiment, one or any combination of die controller 220, stripe placement component 150, decoder circuit 224, state machine circuit 222, decoder circuit 242A, decoder circuit 242B, decoder circuit 240A, decoder circuit 240B, read/write circuits 230A, read/write circuits 230B, and/or controller 244 can be referred to as one or more managing circuits.

Figure 2:
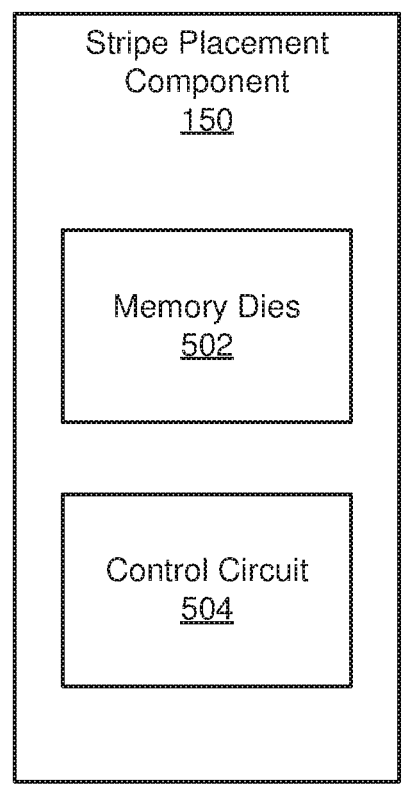
FIG. 2 is a schematic block diagram illustrating one embodiment of a stripe placement component.

FIG. 2 depicts one embodiment of a stripe placement component 150. The stripe placement component 150 may be substantially similar to the stripe placement component 150 described above with regard to FIGS. 1A and/or 1B. In general, as described above, the stripe placement component 150 assigns stripe pages of a RAID stripe to different memory die of a plurality of memory die, and assigns adjacent stripe pages of the RAID stripe to different page numbers. Accordingly, the stripe placement component 150 may facilitate distributing strip pages of a RAID stripe. In the depicted embodiment, the stripe placement component 150 includes memory die 502 and a control circuit 504.

In one embodiment, the memory die 502 (e.g., storage devices) include physical pages for storing data. The memory die 502 may include any suitable number of memory die, such as 2, 3, 4, 5, 6, 7, or more memory die. Each memory die of the memory die 502 has a number of physical pages. In certain embodiments, a number of physical pages per memory die is constant (e.g., each memory die has the same number of physical pages); while in other embodiments, the number of physical pages per memory die may be flexible (e.g., memory die may have a different number of physical pages).

In certain embodiments, the control circuit 504 assigns addresses to data stripes (e.g., array stripes, RAID stripes) for placement of the data stripes at locations within the memory die 502 based on the addresses. In various embodiments, the control circuit 504 determines where the data stripes should be placed within the memory die 502. In some embodiments, the control circuit 504 places the data stripes in the memory die 502. In certain embodiments, a number of pages per data stripe is constant and/or fixed (e.g., data stripes have a same fixed size, each data stripe has the same number of pages, or the like). In one embodiment, the control circuit 504 assigns addresses to the data stripes by assigning stripe pages of a data stripe to different memory die of the memory die 502 (e.g., each stripe page of a data stripe is assigned to a different memory die). In various embodiments, the control circuit 504 assigns adjacent stripe pages of a data stripe to different page numbers (e.g., each set of adjacent stripe pages of a data stripe are assigned to different page numbers).

In some embodiments, each data stripe includes an XOR page. In such embodiments, the control circuit 504 may assign XOR pages corresponding to the data stripes such that a maximum of one XOR page is assigned to a memory die of the memory die 502. In certain embodiments, the XOR pages for the data stripes are all placed in the same page number (e.g., XOR pages are placed in page 0, XOR pages are placed in page 1, etc.). In some embodiments, the XOR pages for the data stripes are distributed across all of the memory die 502. In such embodiments, the XOR pages may be distributed evenly across all of the memory die 502.

In various embodiments, a number of memory die 502 is greater than or equal to a number of pages per data stripe. In some embodiments, a number of memory die 502 is not a multiple of a number of pages per data stripe; while in other embodiments, the number of memory die is a multiple of the number of pages per data stripe. Such embodiments may eliminate a constraint of having a number of memory die 502 being a multiple of a number of pages per data stripe (e.g., multiple of a stripe size, multiple of a stripe length), thereby improving storage system capacity and cost efficiency. In certain embodiments, adjacent stripe pages of data stripes are assigned to physically adjacent memory die 502, adjacent stripe pages of data stripes are assigned to logically adjacent memory die 502, and/or adjacent stripe pages of data stripes are assigned to a first memory die of the memory die 502 and a last memory die of the memory die 502. In various embodiments, physically adjacent memory die 502 may be physically positioned adjacent to one another. In some embodiments, logically adjacent memory die 502 may not be physically positioned adjacent to one another, but may be mapped as logically adjacent memory die 502, or the like.

In some embodiments, a starting page number for data stripes is the same (e.g., all data stripes start at a lowest page number, all data stripes start at a highest page number, etc.). In certain embodiments, a starting page number for data stripes is determined based on a number of memory die 502 and a number of pages per data stripe. Moreover, in various embodiments, a starting memory die of the memory die 502 for data stripes is different (e.g., a first data stripe starts with memory die "0," a second data stripe starts with memory die "1," etc.). In some embodiments, a starting memory die of the memory die 502 for data stripes is determined based on a number of memory die 502. In various embodiments, an ending memory die of the memory die 502 for data stripes is determined based on a number of memory die 502 and a number of pages per data stripe.

In certain embodiments, each stripe page of a data stripe is assigned to a memory die of the memory die 502 and a page number of the memory die based on a predetermined formula. The formula may be any suitable formula. In one embodiment, the formula is based on a number of memory die 502 and a number of pages per data stripe. For example, in one embodiment, a starting die address (SD0) for a data stripe may be determined by the following formula: SD0=(IS % D), where SD0 is a physical die address, IS is a given input stripe, and D is a total number of memory die 502. Moreover, as another example, a starting page offset (SP0) for a data stripe may be determined by the following formula: SP0=(IS/D)×S, where S is a number of pages in the data stripe. Using the prior two examples, the set of (die, page) for a stripe IS is: {(SD0, SP0), ((SD0+1) % D, SP0+1), . . . , ((SD0+S−1) % D, SP0+S−1)}.

Table 1 illustrates one example of using the formula, in which IS=0 to 4, D=5, S=3, and there are 3 pages P per memory die.

TABLE 1

|  | (SD0, SP0) | ((SD0 + 1) % D, SP0 + 1) | ((SD0 + S − 1) % D, SP0 + S − 1) |
| --- | --- | --- | --- |
| IS = 0 | (0, 0) | (1, 1) | (2, 2) |
| IS = 1 | (1, 0) | (2, 1) | (3, 2) |
| IS = 2 | (2, 0) | (3, 1) | (4, 2) |
| IS = 3 | (3, 0) | (4, 1) | (0, 2) |
| IS = 4 | (4, 0) | (0, 1) | (1, 2) |

FIG. 3 is a schematic block diagram illustrating one embodiment of RAID stripe physical placement. Memory die 600 are illustrated and include a first memory die 602, a second memory die 604, a third memory die 606, a fourth memory die 608, a fifth memory die 610, and a sixth memory die 612. Each of the memory die 600 includes a first page 614, a second page 616, and a third page 618. As illustrated, the number of memory die 600 is six; however, in other embodiments, there may be fewer or more memory die 600. In the illustrated embodiment, the number of memory die 600 is a multiple of a number of pages per RAID stripe. For example, in one embodiment, a number of pages per RAID stripe may be 3 (e.g., 2 redundant pages plus one XOR page), and there may be six memory die 600. In such an embodiment, the stripe placement component 150 may place the RAID stripes in the memory die 600 as shown in Table 2. The entries in Table 2 indicate a RAID stripe number R (labeled from 1 to 6) and a page number P (labeled from 0 to 2) of the RAID stripe in the format (R, P). Moreover, the page number P labeled as 2 is an XOR page.

TABLE 2

|  | First Memory Die 602 | Second Memory Die 604 | Third Memory Die 606 | Fourth Memory Die 608 | Fifth Memory Die 610 | Sixth Memory Die 612 |
| --- | --- | --- | --- | --- | --- | --- |
| First Page 614 | (1, 2) | (1, 1) | (1, 0) | (4, 2) | (4, 1) | (4, 0) |
| Second Page 616 | (2, 1) | (2, 2) | (2, 0) | (5, 1) | (5, 2) | (5, 0) |
| Third Page 618 | (3, 1) | (3, 0) | (3, 2) | (6, 1) | (6, 0) | (6, 2) |

Another example of RAID stripe placement may be based on the formulas described in relation to FIG. 2 as shown in Table 3. The embodiments shown by Tables 2 and 3 may be straight-forward data layouts (e.g., simple to execute); however, in response to a failure of a die, RAID stripe placement may not be possible on the remaining die using this type of layout.

TABLE 3

|  | First Memory Die 602 | Second Memory Die 604 | Third Memory Die 606 | Fourth Memory Die 608 | Fifth Memory Die 610 | Sixth Memory Die 612 |
|---|---|---|---|---|---|---|
| First Page 614 | (1, 0) | (2, 0) | (3, 0) | (4, 0) | (5, 0) | (6, 0) |
| Second Page 616 | (6, 1) | (1, 1) | (2, 1) | (3, 1) | (4, 1) | (5, 1) |
| Third Page 618 | (5, 2) | (6, 2) | (1, 2) | (2, 2) | (3, 2) | (4, 2) |

FIG. 4 is a schematic block diagram illustrating another embodiment of RAID stripe physical placement. Memory die 700 are illustrated and include a first memory die 702, a second memory die 704, a third memory die 706, a fourth memory die 708, and a fifth memory die 710. Each of the memory die 700 includes a first page 712, a second page 714, and a third page 716. As illustrated, the number of memory die 700 is five; however, in other embodiments, there may be fewer or more memory die 700.

In the illustrated embodiment, if a number of pages per RAID stripe is 3 (e.g., 2 redundant pages plus one XOR page), the number of memory die 700 is not a multiple of a number of pages per RAID stripe. In such an embodiment, the stripe placement component 150 may place the RAID stripes in the memory die 700 as shown in Table 4 and based on the formulas described in relation to FIG. 2. The entries in Table 4 indicate a RAID stripe number R (labeled from 1 to 5) and a page number P (labeled from 0 to 2) of the RAID stripe in the format (R, P). Moreover, the page number P labeled as 2 is an XOR page. As illustrated, the XOR pages are all in the third page 716 of the memory die 700.

TABLE 4

|  | First Memory Die 702 | Second Memory Die 704 | Third Memory Die 706 | Fourth Memory Die 708 | Fifth Memory Die 710 |
|---|---|---|---|---|---|
| First Page 712 | (1, 0) | (2, 0) | (3, 0) | (4, 0) | (5, 0) |
| Second Page 714 | (5, 1) | (1, 1) | (2, 1) | (3, 1) | (4, 1) |
| Third Page 716 | (4, 2) | (5, 2) | (1, 2) | (2, 2) | (3, 2) |

The embodiment shown by Tables 4 may be a cost effective flexible data layout that may be adjusted based on a number of die; accordingly, in response to a failure of a die, RAID stripe placement may be recalculated on the remaining die using this type of layout.

Figure 5:
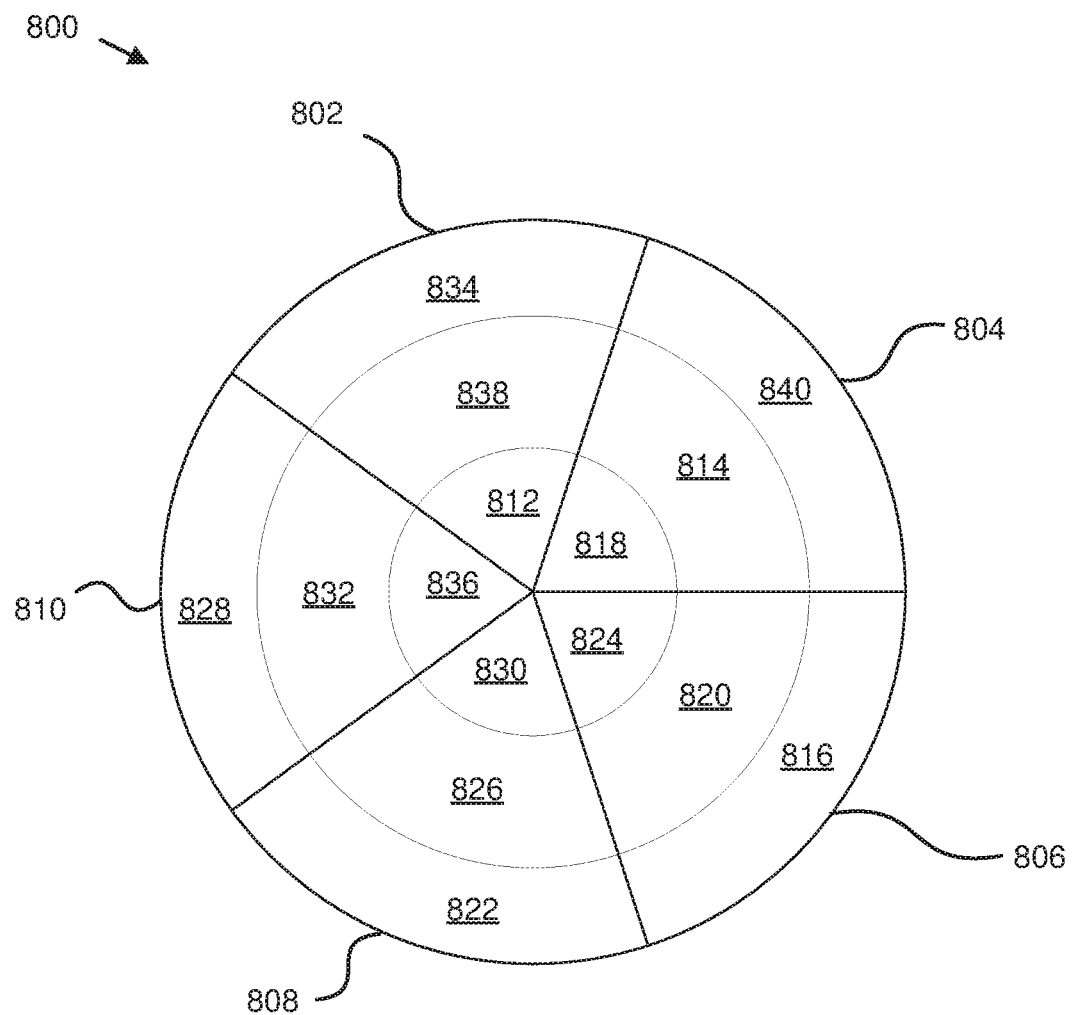
FIG. 5 is a graphical diagram illustrating one embodiment of RAID stripe physical placement.

FIG. 5 is a graphical diagram illustrating one embodiment of RAID stripe physical placement. The graphical diagram illustrates memory die 800 as slices of a pie. The memory die 800 include a first memory die 802, a second memory die 804, a third memory die 806, a fourth memory die 808, and a fifth memory die 810. Each of the memory die 800 includes a first page (e.g., within the smallest circle, the inner ring), a second page (e.g., between the smallest circle and the next circle, the middle ring), and a third page (e.g., between the largest circle and the next circle, the outer ring). As illustrated, the number of memory die 800 is five; however, in other embodiments, there may be fewer or more memory die 800.

In the illustrated embodiment, if a number of pages per RAID stripe is 3 (e.g., 2 redundant pages plus one XOR page), the number of memory die 800 is not a multiple of a number of pages per RAID stripe. In such an embodiment, the stripe placement component 150 may place the RAID stripes in the memory die 800 as shown in Table 6 and based on the formulas described in relation to FIG. 2. The entries in Table 5 indicate a RAID stripe number R and a page number P of the RAID stripe based on element numbers chart shown in Table 5. Moreover, the page number P 2 is an XOR page. As illustrated, the XOR pages are all in the third page of the memory die 800.

TABLE 5

|  | R = 1 | R = 2 | R = 3 | R = 4 | R = 5 |
|---|---|---|---|---|---|
| P = 0 | 812 | 818 | 824 | 830 | 836 |
| P = 1 | 814 | 820 | 826 | 832 | 838 |
| P = 2 | 816 | 822 | 828 | 834 | 840 |

TABLE 6

|  | First Memory Die 802 | Second Memory Die 804 | Third Memory Die 806 | Fourth Memory Die 808 | Fifth Memory Die 810 |
|---|---|---|---|---|---|
| First Page | 812 | 818 | 824 | 830 | 836 |
| Second Page | 838 | 814 | 820 | 826 | 832 |
| Third Page | 834 | 840 | 816 | 822 | 828 |

Figure 6:
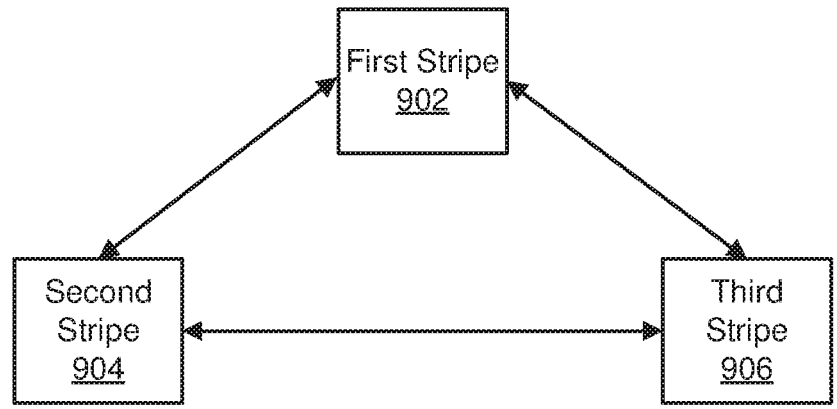
FIG. 6 is a schematic block diagram illustrating one embodiment of access collisions.

FIG. 6 is a schematic block diagram illustrating one embodiment of access collisions 900. In certain embodiments, such as the embodiment illustrated in Table 2, there may be access collisions 900 between a first stripe 902, a second stripe 904, and a third stripe 906 because at least a page of the first stripe 902 shares a same memory die with at least a page of the second stripe 904, at least a page of the first stripe 902 shares a same memory die with at least a page of the third stripe 906, and at least a page of the third stripe 906 shares a same memory die with at least a page of the second stripe 904. However, there are no access collisions between the first stripe 902, the second stripe 904, the third stripe 906, and other stripes.

Figure 7:
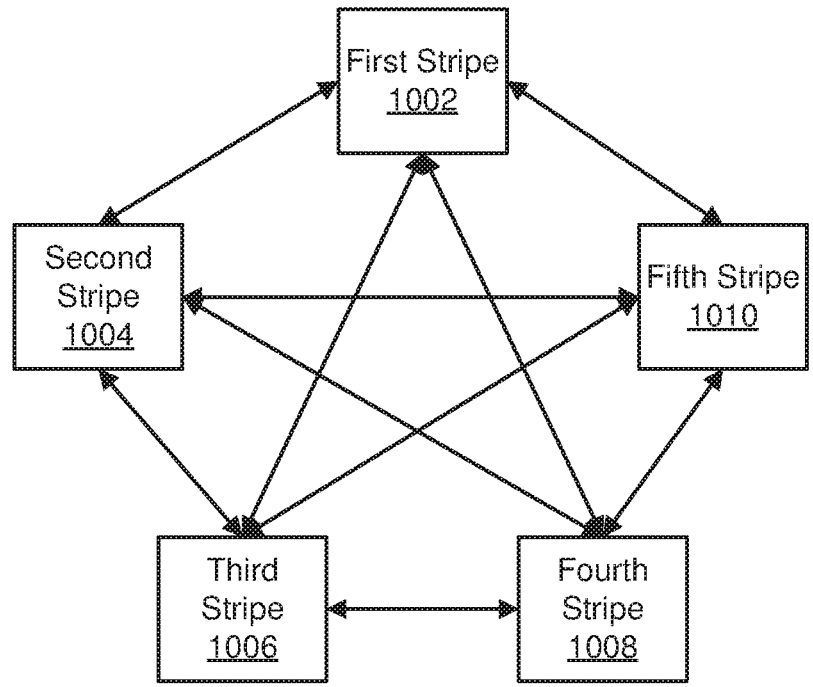
FIG. 7 is a schematic block diagram illustrating another embodiment of access collisions.

FIG. 7 is a schematic block diagram illustrating another embodiment of access collisions 1000. In certain embodiments, such as the embodiment illustrated in Table 4, there may be access collisions 1000 between a first stripe 1002, a second stripe 1004, a third stripe 1006, a fourth stripe 1008, and a fifth stripe 1010 because at least a page of the first stripe 1002 shares a same memory die with at least a page of the second stripe 1004, at least a page of the first stripe 1002 shares a same memory die with at least a page of the third stripe 1006, at least a page of the first stripe 1002 shares a same memory die with at least a page of the fourth stripe 1008, at least a page of the first stripe 1002 shares a same memory die with at least a page of the fifth stripe 1010, at least a page of the second stripe 1004 shares a same memory die with at least a page of the third stripe 1006, at least a page of the second stripe 1004 shares a same memory die with at least a page of the fourth stripe 1008, at least a page of the second stripe 1004 shares a same memory die with at least a page of the fifth stripe 1010, at least a page of the third stripe 1006 shares a same memory die with at least a page of the fourth stripe 1008, at least a page of the third stripe 1006 shares a same memory die with at least a page of the fifth stripe 1010, and at least a page of the fourth stripe 1008 shares a same memory die with at least a page of the fifth stripe 1010. Accordingly, the collisions of the embodiment illustrated in Table 4 may be greater than the collisions of the embodiment illustrated in Table 2.

Figure 8:
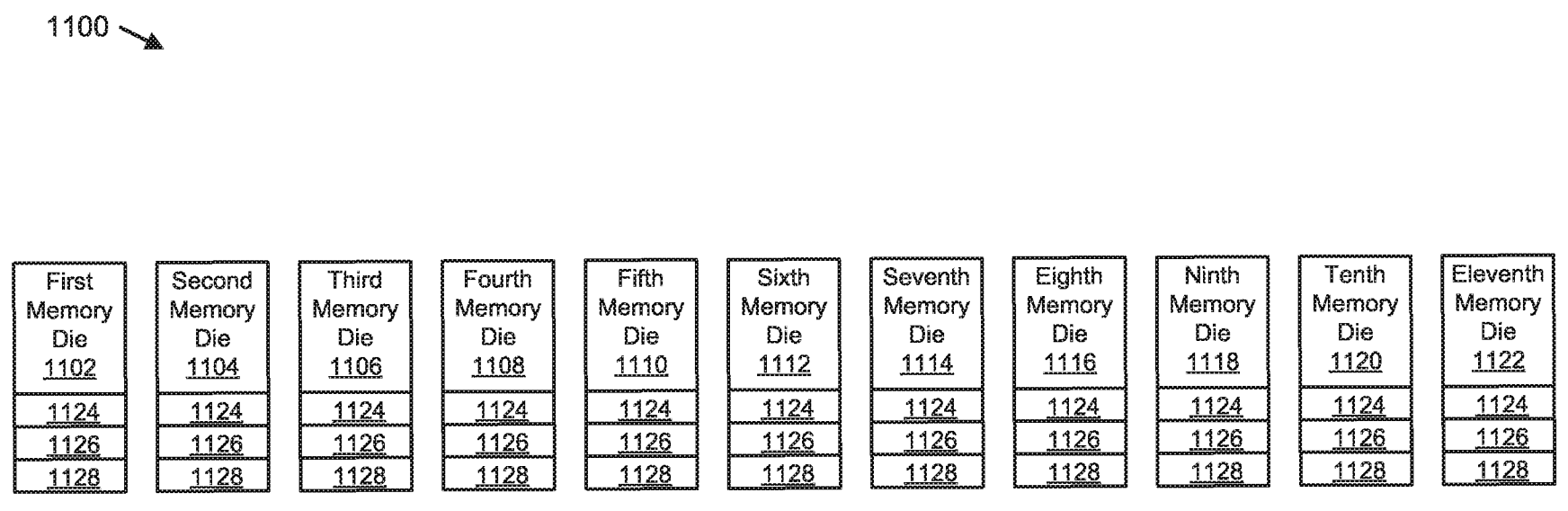

FIG. 8 is a schematic block diagram illustrating a further embodiment of RAID stripe physical placement to facilitate a reduction in collisions. A reduction in collisions may be accomplished by combining features of the embodiments illustrated in Tables 2 and 4. Memory die 1100 are illustrated and include a first memory die 1102, a second memory die 1104, a third memory die 1106, a fourth memory die 1108, a fifth memory die 1110, a sixth memory die 1112, a seventh memory die 1114, an eighth memory die 1116, a ninth memory die 1118, a tenth memory die 1120, and an eleventh memory die 1122. Each of the memory die 1100 includes a first page 1124, a second page 1126, and a third page 1128.

As illustrated, the number of memory die 1100 is eleven; however, in other embodiments, there may be fewer or more memory die 1100. In the illustrated embodiment, if a number of pages per RAID stripe is 3 (e.g., 2 redundant pages plus one XOR page), the number of memory die 1100 is not a multiple of a number of pages per RAID stripe; however, a subset of the memory die 1100 is a multiple of the number of pages per RAID stripe. Accordingly, the stripe placement component 150 may place some of the RAID stripes (e.g., RAID stripes 1 through 6) in the subset of memory die 1100 that is a multiple of the number of pages per RAID stripe based on the embodiment shown in Table 2, and the remainder of the RAID stripes (e.g., RAID stripes 7 through 11) in memory die 1100 that are not a multiple of the number of pages per RAID stripe. In such an embodiment, the stripe placement component 150 may place the RAID stripes in the memory die 1100 as shown in Tables 7 and 8. The entries in Tables 7 and 8 indicate a RAID stripe number R (labeled from 1 to 11) and a page number P (labeled from 0 to 2) of the RAID stripe in the format (R, P). Moreover, the page number P labeled as 2 is an XOR page. As illustrated, the XOR pages are all in the third page 1128 of the memory die 1100.

504 assigns 1202 stripe pages of a data stripe of a plurality of data stripes to different memory die of a plurality of memory die. In one embodiment, the control circuit 504 assigns 1204 adjacent stripe pages of the data stripe to different page numbers, and the method 1200 ends.

A means for storing a plurality of data stripes in a plurality of memory devices, wherein a number of memory devices of the plurality of memory devices is not a multiple of a number of pages per data stripe of the plurality of data stripes, in various embodiments, may include one or more of a stripe placement component 150, a control circuit 504, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. Other embodiments may include similar or equivalent means for storing a plurality of data stripes in a plurality of memory devices, wherein a number of memory devices of the plurality of memory devices is not a multiple of a number of pages per data stripe of the plurality of data stripes.

A means for determining locations to store the plurality of data stripes, in certain embodiments, may include one or more of a stripe placement component 150, a control circuit 504, a non-volatile memory device 120, a non-volatile memory medium controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer readable storage medium. In certain embodiments, the means for determining locations to store the plurality of data stripes may include a formula based on the number of memory devices and the number of pages per data stripe. Other embodiments may include similar or equivalent means for determining locations to store the plurality of data stripes.

The present disclosure may be embodied in other specific forms without departing from its spirit or essential characteristics. The described embodiments are to be considered in

TABLE 7

|  | First Memory Die 1102 | Second Memory Die 1104 | Third Memory Die 1106 | Fourth Memory Die 1108 | Fifth Memory Die 1110 | Sixth Memory Die 1112 |
| --- | --- | --- | --- | --- | --- | --- |
| First Page 1124 | (1, 2) | (1, 1) | (1, 0) | (4, 2) | (4, 1) | (4, 0) |
| Second Page 1126 | (2, 1) | (2, 2) | (2, 0) | (5, 1) | (5, 2) | (5, 0) |
| Third Page 1128 | (3, 1) | (3, 0) | (3, 2) | (6, 1) | (6, 0) | (6, 2) |

TABLE 8

|  | Seventh Memory Die 1114 | Eighth Memory Die 1116 | Ninth Memory Die 1118 | Tenth Memory Die 1120 | Eleventh Memory Die 1122 |
| --- | --- | --- | --- | --- | --- |
| First Page 1124 | (7, 0) | (8, 0) | (9, 0) | (10, 0) | (11, 0) |
| Second Page 1126 | (11, 1) | (7, 1) | (8, 1) | (9, 1) | (10, 1) |
| Third Page 1128 | (10, 2) | (11, 2) | (7, 2) | (8, 2) | (9, 2) |

Figure 9:
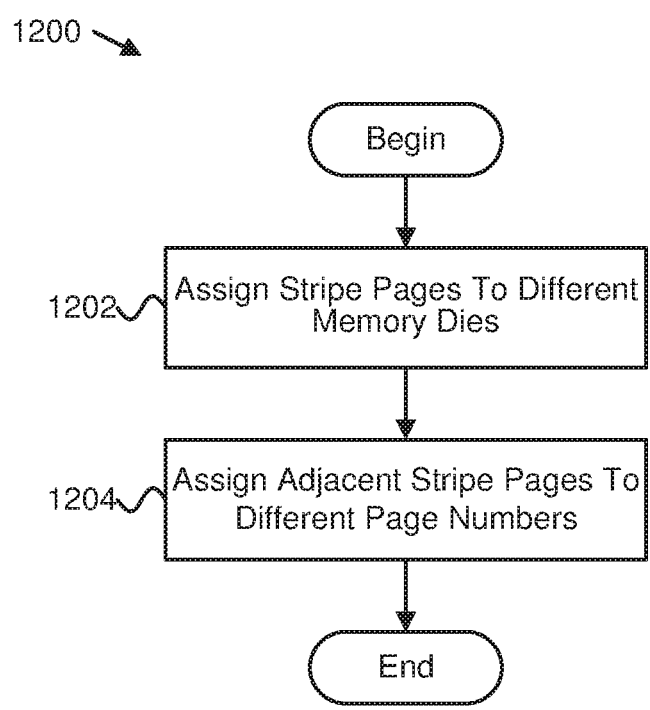
FIG. 9 is a schematic flow chart diagram illustrating one embodiment of a method for RAID stripe physical placement.

FIG. 9 is a schematic flow chart diagram illustrating one embodiment of a method 1200 for RAID stripe physical placement. The method 1200 begins, and the control circuit all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
   a plurality of memory die comprising physical pages for storing data, wherein each memory die of the plurality of memory die comprises a plurality of physical pages with a range of page numbers and each memory die of the plurality of memory die has the same range of page numbers; and a control circuit that assigns physical addresses to a plurality of data stripes, wherein the control circuit assigns the physical addresses to the plurality of data stripes by:

assigning stripe pages of a data stripe of the plurality of data stripes to different memory die of the plurality of memory die; and assigning adjacent stripe pages of the data stripe to different page numbers of the range of page numbers of the different memory die of the plurality of memory die.

2. The apparatus of claim 1, wherein the control circuit assigns exclusive or (XOR) pages corresponding to the plurality of data stripes such that a maximum of one XOR page is assigned to a memory die of the plurality of memory die.

3. The apparatus of claim 1, wherein the plurality of data stripes each have a same, fixed number of pages per data stripe.

4. The apparatus of claim 1, wherein a number of memory die is greater than or equal to a number of pages per data stripe, and the number of memory die is not a multiple of the number of pages per data stripe.

5. The apparatus of claim 1, wherein adjacent stripe pages of data stripes of the plurality of data stripes are assigned to physically adjacent memory die of the plurality of memory die, logically adjacent memory die of the plurality of memory die, a first memory die of the plurality of memory die and a last memory die of the plurality of memory die, or a combination thereof.

6. The apparatus of claim 1, wherein data stripes of the plurality of data stripes comprise an XOR page.

7. The apparatus of claim 6, wherein the XOR page for the data stripes is placed in a same page number.

8. The apparatus of claim 1, wherein a starting page number for data stripes of the plurality of data stripes is the same.

9. The apparatus of claim 1, wherein a starting memory die of the plurality of memory die for data stripes of the plurality of data stripes is different.

10. The apparatus of claim 1, wherein each stripe page of a data stripe of the plurality of data stripes is assigned to a memory die of the plurality of memory die and a page number of the memory die based on a predetermined formula.

11. The apparatus of claim 10, wherein the formula is based on a number of memory die of the plurality of memory die and the number of pages per data stripe.

12. A system comprising:

a controller; and a plurality of storage devices comprising physical pages for storing data, wherein each storage device of the plurality of storage devices comprises a plurality of physical pages with a range of page numbers and each storage device of the plurality of storage devices has the same range of page numbers, the controller is configured to distribute a plurality of array stripes having a number of physical pages per array stripe across the plurality of storage devices by:

placing stripe pages of an array stripe of the plurality of array stripes in different storage devices of the plurality of storage devices;

assigning exclusive or (XOR) pages corresponding to the plurality of array stripes such that the XOR pages are distributed across the plurality of storage devices; and assigning adjacent stripe pages of the array stripe to different page numbers of the range of page numbers of the different storage devices of the plurality of storage devices.

13. The system of claim 12, wherein the XOR pages are distributed such that a storage device of the plurality of storage devices has a maximum of one XOR page assigned to the storage device.

14. The system of claim 12, wherein a number of storage devices of the plurality of storage devices is not a multiple of the number of pages per array stripe.

15. The system of claim 12, wherein a number of storage devices of the plurality of storage devices is a multiple of the number of pages per array stripe.

16. The system of claim 12, wherein a starting storage device of the plurality of storage devices for an array stripe of the plurality of array stripes is determined based on a number of storage devices of the plurality of storage devices and an ending storage device of the plurality of storage devices for the array stripe is determined based on the number of storage devices of the plurality of storage devices and the number of pages per data stripe.

17. The system of claim 12, wherein a starting page for an array stripe of the plurality of array stripes is determined based on a number of storage devices of the plurality of storage devices and the number of pages per data stripe.

18. An apparatus comprising:

means for storing a plurality of data stripes in a plurality of memory devices, wherein a number of memory devices of the plurality of memory devices is not a whole number multiple of a number of pages used to store each data stripe of the plurality of data stripes; and means for determining physical locations to store the plurality of data stripes.

19. The apparatus of claim 18, wherein the means for determining locations to store the plurality of data stripes comprises a formula based on the number of memory devices and the number of pages per data stripe.

* * * * *